US006525861B1

(12) United States Patent
Roberts et al.

(10) Patent No.: US 6,525,861 B1
(45) Date of Patent: Feb. 25, 2003

(54) ELECTROCHROMIC DEVICE HAVING A CURRENT-REDUCING ADDITIVE

(75) Inventors: Kathy E. Roberts, East Grand Rapids, MI (US); Thomas F. Guarr, Holland, MI (US)

(73) Assignee: Gentex Corporation, Zeeland, MI (US)

( * ) Notice: Subject to any disclaimer, the term of this patent is extended or adjusted under 35 U.S.C. 154(b) by 0 days.

(21) Appl. No.: 10/012,937

(22) Filed: Dec. 10, 2001

(51) Int. Cl.⁷ .................................. G02F 1/15
(52) U.S. Cl. ................ 359/265; 359/272; 359/273; 359/275
(58) Field of Search ................ 359/265–275; 252/582, 583, 586

(56) References Cited

U.S. PATENT DOCUMENTS

| | | | |
|---|---|---|---|
| 4,902,108 A | 2/1990 | Byker | 359/265 |
| 5,142,407 A | 8/1992 | Varaprasad et al. | 359/276 |
| 5,679,283 A | 10/1997 | Tonar et al. | 252/583 |
| 5,888,431 A | 3/1999 | Tonar et al. | 252/583 |
| 5,928,572 A | 7/1999 | Tonar et al. | 252/583 |
| 5,998,617 A * | 12/1999 | Srinivasa et al. | 544/347 |
| 6,037,471 A * | 3/2000 | Srinivasa et al. | 546/257 |
| 6,137,620 A * | 10/2000 | Guarr et al. | 252/583 |
| 6,195,192 B1 * | 2/2001 | Baumann et al. | 252/582 |
| 6,248,263 B1 | 6/2001 | Tonar et al. | 252/583 |
| 6,249,369 B1 * | 6/2001 | Theiste et al. | 359/265 |
| 6,288,825 B1 * | 9/2001 | Byker et al. | 252/583 |
| 6,392,783 B1 * | 5/2002 | Lomprey et al. | 252/583 |
| 6,445,486 B1 * | 9/2002 | Lomprey et al. | 252/582 |
| 2002/0118436 A1 * | 10/2001 | Lomprey et al. | 359/265 |

* cited by examiner

Primary Examiner—Evelyn A Lester
(74) Attorney, Agent, or Firm—King & Jovanovic, PLC (57) ABSTRACT

An electrochromic medium for use in an electrochromic device comprising: at least one solvent; an anodic electroactive material; a cathodic electroactive material, wherein at least one of the anodic and cathodic electroactive materials is electrochromic; and a current-reducing additive, wherein the current-reducing additive comprises a polymer present in an effective concentration to materially reduce the current of the electrochromic medium upon application of an electrical potential, relative to an electrochromic medium without the current-reducing additive, while maintaining an electrochromic medium viscosity which facilitates acceptable production rates without a problematic degree of seal or other device component failure.

60 Claims, 6 Drawing Sheets

Fig. 6

ELECTROCHROMIC DEVICE HAVING A CURRENT-REDUCING ADDITIVE

BACKGROUND OF THE INVENTION

1. Field of the Invention

The present invention relates in general to electrochromic devices, and more particularly, to an electrochromic medium for use in an electrochromic device which includes a current-reducing additive comprising a polymer present in an effective concentration to materially reduce the current of the electrochromic medium upon application of an electrical potential, relative to an electrochromic medium without the current-reducing additive, while maintaining a sufficiently low viscosity to facilitate acceptable production rates without a problematic degree of seal or other device component failure.

2. Background Art

Electrochromic devices have been known in the art for several years. While the utilization of electrochromic devices, such as electrochromic mirrors, has become increasingly popular, for example, among the automotive industry, the operating current of many electrochromic devices remains problematic for a plurality of reasons.

For example, one problem associated with electrochromic devices which, at least in part, can be attributed to current or electron flow is the formation of color bands proximate the electrodes of the electrochromic device, which is commonly referred to as "segregation." Segregation can be especially prevalent after an electrochromic device is held in a low transmission or colored state for an extended period of time. Electrochromic windows are very susceptible to segregation inasmuch as, during normal operation, they may remain in a colored state for several, continuous hours.

A second problem associated with electrochromic devices that is directly related to current is that the electrochromic devices can generate a substantial amount of heat upon application of an electrical potential. The generated heat can, in turn, impart undesirable stress upon many of the electrical components used to control the electrochromic device. Often times, this requires many of the electrical components to be specially designed to handle extreme temperature variations for extended periods of time, which can materially increase the cost of the electrochromic device.

A third problem associated with electrochromic devices that is directly related to current is that the electrochromic devices can require a substantial draw of power during normal operation, which is a material concern with large area electrochromic devices, such as large exterior electrochromic mirrors for automobiles or electrochromic windows for residential, commercial, and/or industrial buildings.

One attempt to reduce current is disclosed in U.S. Pat. No. 5,142,407 (hereinafter the '407 patent). The '407 patent teaches incorporating cyanoethylsucrose (hereinafter "CES"), a non-polymer, into an electrochromic medium to reduce leakage current. However, the incorporation of CES into an electrochromic medium is undesirable for a plurality of reasons, including, but not limited to, the fact that CES can be costly, especially at the loading concentrations required to materially reduce leakage current. Moreover, the incorporation of an additive in such high concentrations may raise issues relative to the long term performance, stability, and/or operation of an associated electrochromic device.

It is therefore an object of the present invention to provide an electrochromic device which utilizes one or more relatively common and inexpensive low molecular weight polymers as current-reducing additives that remedy, or at least minimize, the aforementioned detriments and/or complications associated with the operating current of many presently available electrochromic devices while maintaining a sufficiently low viscosity to facilitate acceptable production rates without a problematic degree of seal or other device component failure.

In addition, if an electrochromic device is operating at an acceptable current, the incorporation of one or more additives of the present invention can enable an electrochromic device to be reconfigured with a smaller cell spacing while maintaining a generally constant current. Electrochromic devices having reduced cell spacing are beneficial for at least three reasons. First, electrochromic devices having reduced cell spacing can more easily achieve an acceptable image or viewing quality, especially for large-scale electrochromic devices. Second, electrochromic devices having reduced cell spacing contain less electrochromic medium, and, accordingly, have an inherently lower cost. They also weigh less, which can be important for small scale, mobile, and/or weight sensitive applications. Third, electrochromic devices having reduced cell spacing can be manufactured with increased efficiency.

These and other objectives of the invention will become apparent in light of the present specification, claims, and drawings.

SUMMARY OF THE INVENTION

The present invention is directed to an electrochromic medium for use in an electrochromic device comprising: (a) at least one solvent; (b) an anodic electroactive material; (c) a cathodic electroactive material, wherein at least one of the anodic and cathodic electroactive materials is electrochromic; and (d) a current-reducing additive, wherein the current-reducing additive comprises a polymer present in an effective concentration to materially reduce the current of the electrochromic medium upon application of an electrical potential, relative to an electrochromic medium without the current-reducing additive, while maintaining a sufficiently low viscosity to facilitate acceptable production rates without a problematic degree of seal or other device component failure.

The present invention is also directed to an electrochromic device comprising: (a) a first substantially transparent substrate having an electrically conductive material associated therewith; (b) a second substantially transparent substrate having an electrically conductive material associated therewith; and (c) an electrochromic medium contained within a chamber positioned between the first and second substrates which comprises: (1) at least one solvent; (2) an anodic electroactive material; (3) a cathodic electroactive material, wherein at least one of the anodic and cathodic electroactive materials is electrochromic; and (4) a current-reducing additive, wherein the current-reducing additive comprises a polymer present in an effective concentration to materially reduce the current of the electrochromic medium upon application of an electrical potential, relative to an electrochromic medium without the current-reducing additive, while maintaining a sufficiently low viscosity to facilitate acceptable production rates without a problematic degree of seal or other device component failure.

BRIEF DESCRIPTION OF THE DRAWINGS

The invention will now be described with reference to the drawings wherein.

DETAILED DESCRIPTION OF THE INVENTION

Figure 1:
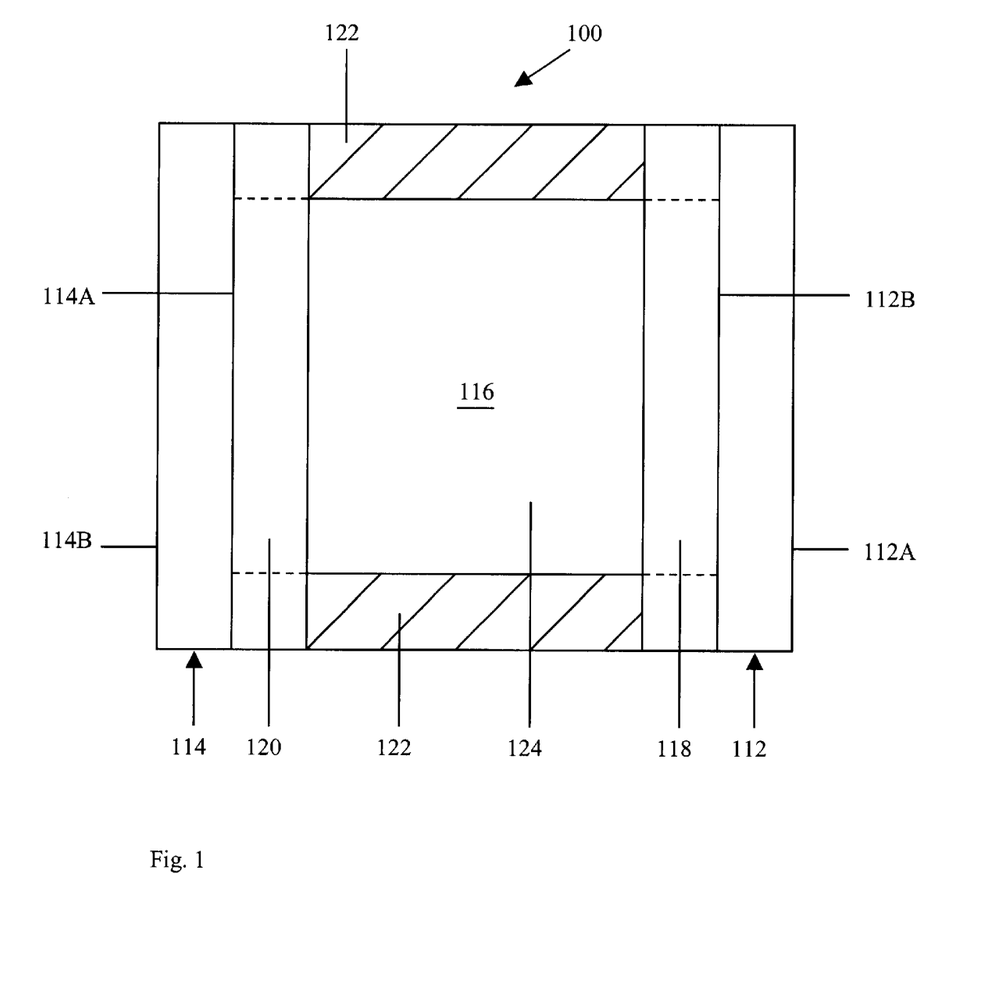
FIG. 1 of the drawings is a cross-sectional schematic representation of an electrochromic device fabricated in accordance with the present invention.

Referring now to the drawings and to FIG. 1 in particular, a cross-sectional schematic representation of electrochromic device 100 is shown, which generally comprises first substrate 112 having front surface 112A and rear surface 112B, second substrate 114 having front surface 114A and rear surface 114B, and chamber 116 for containing electrochromic medium 124. It will be understood that electrochromic device 100 may comprise, for illustrative purposes only, a mirror, a window, a display device, a contrast enhancement filter, and the like. It will be further understood that FIG. 1 is merely a schematic representation of electrochromic device 100. As such, some of the components have been distorted from their actual scale for pictorial clarity. Indeed, numerous other electrochromic device configurations are contemplated for use, including those disclosed in U.S. Pat. No. 5,818,625 entitled "Electrochromic Rearview Mirror Incorporating A Third Surface Metal Reflector" and U.S. application Ser. No. 09/343,345 entitled "Electrode Design For Electrochromic Devices," both of which are incorporated herein by reference in their entirety.

First substrate 112 may be fabricated from any one of a number of materials that are transparent or substantially transparent in the visible region of the electromagnetic spectrum, such as, for example, borosilicate glass, soda lime glass, float glass, natural and synthetic polymeric resins, plastics, and/or composites including Topas®, which is commercially available from Ticona of Summit, N.J. First substrate 112 is preferably fabricated from a sheet of glass having a thickness ranging from approximately 0.5 millimeters (mm) to approximately 12.7 mm. Of course, the thickness of the substrate will depend largely upon the particular application of the electrochromic device. While particular substrate materials have been disclosed, for illustrative purposes only, it will be understood that numerous other substrate materials are likewise contemplated for use—so long as the materials are at least substantially transparent and exhibit appropriate physical properties, such as strength to be able to operate effectively in conditions of intended use. Indeed, electrochromic devices in accordance with the present invention can be, during normal operation, exposed to extreme temperatures as well as substantial UV radiation, emanating primarily from the sun.

Second substrate 114 may be fabricated from similar materials as that of first substrate 112. However, if the electrochromic device is a mirror, then the requisite of substantial transparency is not necessary. As such, second substrate 114 may, alternatively, comprise polymers, metals, glass, and ceramics—to name a few. Second substrate 114 is preferably fabricated from a sheet of glass having a thickness ranging from approximately 0.5 mm to approximately 12.7 mm. If first and second substrates 112 and 114, respectively, are fabricated from sheets of glass, then the glass can optionally be tempered prior to or subsequent to being coated with layers of electrically conductive material (118 and 120).

One or more layers of electrically conductive material 118 are associated with rear surface 112B of first substrate 112. These layers serve as an electrode for the electrochromic device. Electrically conductive material 118 is desirably a material that: (a) is substantially transparent in the visible region of the electromagnetic spectrum; (b) bonds reasonably well to first substrate 112; (c) maintains this bond when associated with a sealing member; (d) is generally resistant to corrosion from materials contained within the electrochromic device or the atmosphere; and (e) exhibits minimal diffuse or specular reflectance as well as sufficient electrical conductance. It is contemplated that electrically conductive material 118 may be fabricated from fluorine doped tin oxide (FTO), for example TEC glass, which is commercially available from Libbey Owens-Ford-Co., of Toledo, Ohio, indium/tin oxide (ITO), doped zinc oxide or other materials known to those having ordinary skill in the art.

Electrically conductive material 120 is preferably associated with front surface 114A of second substrate 114, and is operatively bonded to electrically conductive material 118 by sealing member 122. As can be seen in FIG. 1, once bonded, sealing member 122 and the juxtaposed portions of electrically conductive materials 118 and 120 serve to define an inner peripheral geometry of chamber 116.

Electronically conductive material 120 may vary depending upon the intended use of the electrochromic device. For example, if the electrochromic device is a mirror, then the material may comprise a transparent conductive coating similar to electronically conductive material 118 (in which case a reflector is associated with rear surface 114B of second substrate 114). Alternatively, electrically conductive material 120 may comprise a layer of reflective material in accordance with the teachings of previously referenced and incorporated U.S. Pat. No. 5,818,625. In this case, electrically conductive material 120 is associated with front surface 114A of second substrate 114. Typical coatings for this type of reflector include chromium, rhodium, ruthenium, silver, silver alloys, and combinations thereof.

Sealing member 122 may comprise any material that is capable of being adhesively bonded to the electronically conductive materials 118 and 120 to, in turn, seal chamber 116 so that electrochromic medium 124 does not inadvertently leak out of the chamber. As is shown in dashed lines in FIG. 1, it is also contemplated that the sealing member extend all the way to rear surface 112B and front surface 114A of their respective substrates. In such an embodiment, the layers of electrically conductive material 118 and 120 may be partially removed where the sealing member 122 is positioned. If electrically conductive materials 118 and 120 are not associated with their respective substrates, then sealing member 122 preferably bonds well to glass. It will be understood that sealing member 122 can be fabricated from any one of a number of materials including, for example, those disclosed in U.S. Pat. Nos. 4,297,401; 4,418, 102; 4,695,490; 5,596,023; 5,596,024; and 6,157,480, all of which are incorporated herein by reference in their entirety.

For purposes of the present disclosure, electrochromic medium 124 comprises at least one solvent, an anodic material, a cathodic material, and a current-reducing additive. During normal operation of device 100, the current-reducing additive enables electrochromic medium 124 to operate at a materially reduced current at a given electrical potential. However, it will be understood that incorporating the current-reducing additive does not adversely affect the viscosity of the electrochromic medium to a degree where production rate and/or seal or other device component failure becomes problematic. Such a viscosity has been quantitatively determined through production tests to be less than approximately 150 centipoise (cP), and preferably less than approximately 100 cP, and more preferably less than 50 cP at 20 degrees centigrade. Typically both of the anodic and cathodic materials are electroactive and at least one of them is electrochromic. It will be understood that regardless of its ordinary meaning, the term "electroactive" will be defined herein as a material that undergoes a modification in its oxidation state upon exposure to a particular electrical potential difference. Additionally, it will be understood that the term "electrochromic" will be defined herein, regardless of its ordinary meaning, as a material that exhibits a change in its extinction coefficient at one or more wavelengths upon exposure to a particular electrical potential difference.

Electrochromic medium 124 is preferably chosen from one of the following categories:

(1) Single-layer, single-phase:—The electrochromic medium may comprise a single-layer of material which may include small non-homogenous regions and includes solution-phase devices where a material may be contained in solution in the ionically conducting electrolyte which remains in solution in the electrolyte when electrochemically oxidized or reduced. Solution phase electroactive materials may be contained in the continuous solution-phase of a gel medium in accordance with the teachings of U.S. Pat. No. 5,928,572 entitled "Electrochromic Layer And Devices Comprising Same" and International Patent Application Serial No. PCT/US98/05570 entitled "Electrochromic Polymeric Solid Films, Manufacturing Electrochromic Devices Using Such Solid Films, And Processes For Making Such Solid Films And Devices," both of which are incorporated herein by reference in their entirety.

More than one anodic and cathodic material can be combined to give a pre-selected color as described in U.S. Pat. Nos. 5,998,617, 6,020,987, 6,037,471, 6,141,137 and PCT Application Publication No. WO98/44348, all of which are hereby incorporated herein by reference in their entirety.

The anodic and cathodic materials can be combined or linked by a bridging unit as described in International Application Serial No. PCT/WO97/30134 entitled "Electrochromic System," which is incorporated herein by reference in its entirety. The electrochromic materials can additionally include near infrared (NIR) absorbing compounds as described in U.S. Pat. No. 6,193,912, which is also incorporated herein by reference in its entirety.

It is also possible to link anodic materials or cathodic materials by similar methods. The concepts described in these applications/patents can further be combined to yield a variety of electroactive materials that are linked or coupled, including linking of a color-stabilizing moiety to an anodic and/or cathodic material, including those disclosed in U.S. Pat. No. 6,188,505 B1 entitled "Color-Stabilized Electrochromic Devices," which is incorporated herein by reference in its entirety.

The anodic and cathodic electrochromic materials can also include coupled materials as described in U.S. Pat. No. 6,249,369 entitled "Coupled Electrochromic Compounds With Photostable Oxidation States," which is hereby incorporated herein by reference in its entirety.

The concentration of the electrochromic materials can be selected as taught in U.S. Pat. No. 6,137,620 entitled "Electrochromic Media With Concentration Enhanced Stability, Process For The Preparation Thereof, and Use In Electrochromic Devices," the entirety of which is hereby incorporated herein by reference.

Additionally, a single-layer, single-phase medium may include a medium where the anodic and cathodic materials are incorporated into a polymer matrix as is described in International Application Serial No. PCT/WO99/02621 entitled "Electrochromic Polymer System" and International Patent Application Serial No. PCT/US98/05570 entitled "Electrochromic Polymeric Solid Films, Manufacturing Electrochromic Devices Using Such Solid Films, And Processes For Making Such Solid Films And Devices."

(2) Multi-layer—the medium may be made up in layers and includes a material attached directly to an electronically conducting electrode or confined in close proximity thereto which remains attached or confined when electrochemically oxidized or reduced.

(3) Multi-phase—one or more materials in the medium undergoes a change in phase during the operation of the device, for example a material contained in solution in the ionically conducting electrolyte forms a layer on the electronically conducting electrode when electrochemically oxidized or reduced.

In addition, electrochromic medium 124 may comprise other materials, such as light absorbers, light stabilizers, thermal stabilizers, antioxidants, tint providing agents, redox buffers, and mixtures thereof. Suitable UV-stabilizers may include: the material ethyl-2-cyano-3,3-diphenyl acrylate, sold by BASF of Parsippany, N.Y., under the trademark Uvinul N-35 and by Aceto Corp., of Flushing, N.Y., under the trademark Viosorb 910; the material (2-ethylhexyl)-2-cyano-3,3-diphenyl acrylate, sold by BASF under the trademark Uvinul N-539; the material 2-(2'-hydroxy-4'-methylphenyl)benzotriazole, sold by Ciba-Geigy Corp. under the trademark Tinuvin P; the material 3-[3-(2H-benzotriazole-2-yl)-5-(1,1-dimethylethyl)-4-hydroxyphenyl]propionic acid pentyl ester prepared from Tinuvin 213, sold by Ciba-Geigy Corp., via transesterification or conventional hydrolysis followed by conventional esterification (hereinafter "Tinuvin PE"); the material 2,4-dihydroxybenzophenone sold by, among many others, Aldrich Chemical Co.; the material 2-hydroxy-4-methoxybenzophenone sold by American Cyanamid under the trademark Cyasorb UV 9; and the material 2-ethyl-2'-ethoxyalanilide sold by Sandoz Color & Chemicals under the trademark Sanduvor VSU—to name a few.

The anodic material may include, for example, ferrocene, substituted ferrocenes, substituted ferrocenyl salts, substituted phenazines, phenothiazine, substituted phenothiazines, thianthrene, substituted thianthrenes. Examples of anodic materials may include di-tert-butyl-diethylferrocene, 5,10-dimethyl-5,10-dihydrophenazine, 3,7,10-trimethylphenothiazine, 2,3,7,8-tetramethoxythianthrene, and 10-methylphenothiazine. It is also contemplated that the anodic material may comprise a polymer film, such as polyaniline, polythiophenes, polymeric metallocenes, or a solid transition metal oxide, including, but not limited to, oxides of vanadium, nickel, iridium, as well as numerous heterocyclic compounds, etcetera. It will be understood that numerous other anodic materials are contemplated for use including those disclosed in U.S. Pat. No. 4,902,108 entitled "Single-Compartment, Self-Erasing, Solution-Phase Electrochromic Devices, Solutions For Use Therein, And Uses Thereof," which is incorporated herein by reference in its entirety, as well as previously referenced and incorporated U.S. Pat. No. 6,188,505 B1.

The cathodic material may include, for example, viologens, such as methyl viologen tetrafluoroborate, octyl viologen tetrafluoroborate, or benzyl viologen tetrafluoroborate. It will be understood that the preparation and/or commercial availability for each of the above-identified cathodic materials is well known in the art. While specific cathodic materials have been provided, for illustrative purposes only, numerous other conventional cathodic materials are likewise contemplated for use including, but by no means limited to, those disclosed in previously referenced and incorporated U.S. Pat. No. 4,902,108. Indeed, the only contemplated limitation relative to the cathodic material is that it should not adversely affect the electrochromic performance of the device 100. Moreover, it is contemplated that the cathodic material may comprise a polymer film, such as various substituted polythiophenes, polymeric viologens, an inorganic film, or a solid transition metal oxide, including, but not limited to, tungsten oxide.

For illustrative purposes only, the concentration of the anodic and cathodic materials can range from approximately 1 mM to approximately 500 mM and more preferably from approximately 2 mM to approximately 100 mM. While particular concentrations of the anodic as well as cathodic materials have been provided, it will be understood that the desired concentration may vary greatly depending upon the geometric configuration of the chamber containing electrochromic medium 124.

For purposes of the present disclosure, the solvent of electrochromic medium 124 may comprise any one of a number of common, commercially available solvents including 3-methylsulfolane, dimethyl sulfoxide, dimethyl formamide, acetonitrile, tetraglyme and other polyethers, alcohols such as ethoxyethanol, nitrites, such as glutaronitrile, 3-hydroxypropionitrile, 2-methylglutaronitrile, ketones including 2-acetylbutyrolactone, cyclopentanone, cyclic esters including beta-propiolactone, gamma-butyrolactone, gamma-valerolactone, propylene carbonate, ethylene carbonate and homogenous mixtures of the same. While specific solvents have been disclosed as being associated with the electrochromic medium, numerous other solvents that would be known to those having ordinary skill in the art having the present disclosure before them are likewise contemplated for use.

In accordance with the present invention, one or more current-reducing additive(s) are associated with electrochromic medium 124, which, among other things, enable the electrochromic medium to operate at a reduced current and/or cell spacing without unduly increasing the viscosity of the electrochromic medium. For purposes of the present invention, the current-reducing additives may generally comprise any one of a number of polymers including, polyamides, polyimides, polycarbonates, polyesters, polyethers, polymethylmethacrylates, polymethacrylates, polyacrylates, polysilanes, polysiloxanes, polyvinylacetates, polyacrylnitriles, polyvinylalcohols, and combinations thereof.

In a first embodiment of the present invention, the current-reducing additive may comprise at least one polymer based on polymerization of a material represented by formula I:

wherein $R_{1-4}$ are the same or different and comprise H, a halide, a hydroxy group, a cyano group, an isocyano group, an isothiocyano group, a substituted or unsubstituted and straight or branched alkyl, cycloalkyl, polycycloalkyl, heterocycloalkyl, aryl, alkaryl, aralkyl, alkoxy, alkenyl, or alkynyl group containing approximately 1 to approximately 40 carbon atom(s), carbonyls, esters, carbonates, amides, ketenes, epoxides, a silyl or siloxyl group containing approximately 1 to approximately 40 silicon atom(s), and combinations thereof, wherein the average molecular weight of the current-reducing additive is greater than approximately 1,000 Daltons, and preferably ranges from approximately 1,000 to approximately 85,000 Daltons, and more preferably ranges from approximately 1,500 to approximately 50,000 Daltons.

in this embodiment, the current-reducing additive may comprise polymethylmethacrylate (hereinafter "PMMA"), or a co-polymer of MMA and ethyl acrylate which is also known as PMMA/PEA copolymer.

In a second embodiment of the present invention, the current-reducing additive may comprise at least one polymer based on polymerization of a material represented by formula II:

wherein $R_{5-8}$ are the same or different and comprise H, a halide, a hydroxy group, a cyano group, an isocyano group, an isothiocyano group, a substituted or unsubstituted and straight or branched alkyl, cycloalkyl, polycycloalkyl, heterocycloalkyl, aryl, alkaryl, aralkyl, alkoxy, alkenyl, or alkynyl group containing approximately 1 to approximately 40 carbon atom(s), carbonyls, esters, carbonates, amides, ketenes, epoxides, a silyl or siloxyl group containing approximately 1 to approximately 40 silicon atom(s), and combinations thereof, wherein the average molecular weight of the current-reducing additive is greater than approximately 1,000 Daltons, and preferably ranges from approximately 1,000 to approximately 125,000 Daltons, and more preferably ranges from approximately 1,500 to approximately 50,000 Daltons.

In this embodiment, the current-reducing additive may comprise, for example, polyvinylacetate (hereinafter "PVA").

In a third embodiment of the present invention, the current-reducing additive may comprise at least one polymer represented by formula III:

wherein $R_9$ comprises a substituted or unsubstituted and straight or branched alkyl, cycloalkyl, polycycloalkyl, heterocycloalkyl, aryl, alkaryl, aralkyl, alkoxy, alkenyl, or alkynyl group containing approximately 1 to approximately 40 carbon atom(s), carbonyls, esters, carbonates, amides, ketenes, epoxides, a silyl or siloxyl group containing approximately 1 to approximately 40 silicon atom(s), and combinations thereof, wherein n is an integer which ranges in value from 0 to approximately 1,700, wherein the average molecular weight of the current-reducing additive is greater than approximately 1,000 Daltons, and preferably ranges from approximately 1,000 to approximately 125,000 Daltons, and more preferably ranges from approximately 1,500 to approximately 50,000 Daltons.

In a fourth embodiment of the present invention, the current-reducing additive may comprise at least one polymer represented by formula IV:

(IV)

wherein $R_{10-11}$ are the same or different and comprise a substituted or unsubstituted and straight or branched alkyl, cycloalkyl, polycycloalkyl, heterocycloalkyl, aryl, alkaryl, aralkyl, alkoxy, alkenyl, or alkynyl group containing approximately 1 to approximately 40 carbon atom(s), carbonyls, esters, carbonates, amides, ketenes, epoxides, a silyl or siloxyl group containing approximately 1 to approximately 40 silicon atom(s), and combinations thereof, wherein n is an integer which ranges in value from 0 to approximately 1,100, wherein the average molecular weight of the current-reducing additive is greater than approximately 1,000 Daltons, and preferably ranges from approximately 1,000 to approximately 125,000 Daltons, and more preferably from approximately 1,500 to approximately 50,000 Daltons.

In a fifth embodiment of the present invention, the current-reducing additive may comprise at least one polymer based on formula V:

(V)

wherein $R_{12-15}$ are the same or different and comprise H, a halide, a hydroxy group, a cyano group, an isocyano group, an isothiocyano group, a substituted or unsubstituted and straight or branched alkyl, cycloalkyl, polycycloalkyl, heterocycloalkyl, aryl, alkaryl, aralkyl, alkoxy, alkenyl, or alkynyl group containing approximately 1 to approximately 40 carbon atom(s), carbonyls, esters, carbonates, amides, ketenes, epoxides, a silyl or siloxyl group containing approximately 1 to approximately 40 silicon atom(s), and combinations thereof, wherein m is an integer which ranges in value from 0 to approximately 500, wherein n is an integer which ranges in value from 1 to approximately 20, wherein the average molecular weight of the current-reducing additive is greater than approximately 1,000 Daltons, and preferably ranges from approximately 1,000 to approximately 125,000 Daltons, and more preferably ranges from approximately 1,500 to approximately 50,000 Daltons.

Preferably the concentration of the above-identified current-reducing additives range from approximately 5% by weight to approximately 75% by weight, and more prefer- ably from approximately 8% by weight to approximately 30% by weight.

It will be understood that the current-reducing additives of the present invention may comprise polymers, copolymers which may be random or alternating and/or block or grafted in nature, or a hybrid of both. It will be further understood that numerous other polymer configurations that would be known to those with ordinary skill in the art having the present disclosure before them are likewise contemplated for use.

Electrochromic devices having as a component part an electrochromic medium comprising one or more current-reducing additives can be used in a wide variety of applications wherein the transmitted or reflected light can be modulated. Such devices include rear-view mirrors for vehicles; windows for the exterior of a building, home or vehicle; skylights for buildings including tubular light filters; windows in office or room partitions; display devices; contrast enhancement filters for displays; light filters for photographic devices and light sensors; and indicators for power cells as well as primary and secondary electrochemical cells.

In support of the present invention, several experiments were conducted wherein electrochromic devices were prepared which comprised one or more current-reducing additives, the operating current of which were directly compared to analogous devices filled with different concentrations of the same current-reducing additive(s). It will be understood that the current-reducing additives are commercially available from Aldrich Chemical Co. of Milwaukee, Wis., Inolex Chemical Co. of Philadelphia, Pa., and/or other commercial chemical vendors.

In each one of the experiments below, a series of electrochromic devices were filled via conventional vacuum backfilling techniques. In particular, each one of the electrochromic devices included a first 2×5 inch substrate coated with generally clear, conductive fluorine-doped tin oxide on the rear surface (112B), and a second 2×5 inch substrate coated with generally clear, conductive fluorine-doped tin oxide on the front surface (114A) and a standard silver reflector on the rear surface (114B). The two substrates were spaced 137 microns apart for accommodating the medium.

Experiment No. 1

In experiment No. 1, the electrochromic medium was prepared by mixing the following materials together in the concentrations provided below:

| Component | Material | Concentration |
|---|---|---|
| Cathodic | Octylviologen [$BF_4$]$_2$ | 38.0 mM |
| Anodic | 5,10-Dimethyl-5,10-dihydrophenazine | 27.0 mM |
| Current-Reducing Additive | PMMA (350,000 Daltons) | 0, 3, and 5% by wt. |
| Solvent | Propylene carbonate | — |

Figure 2:
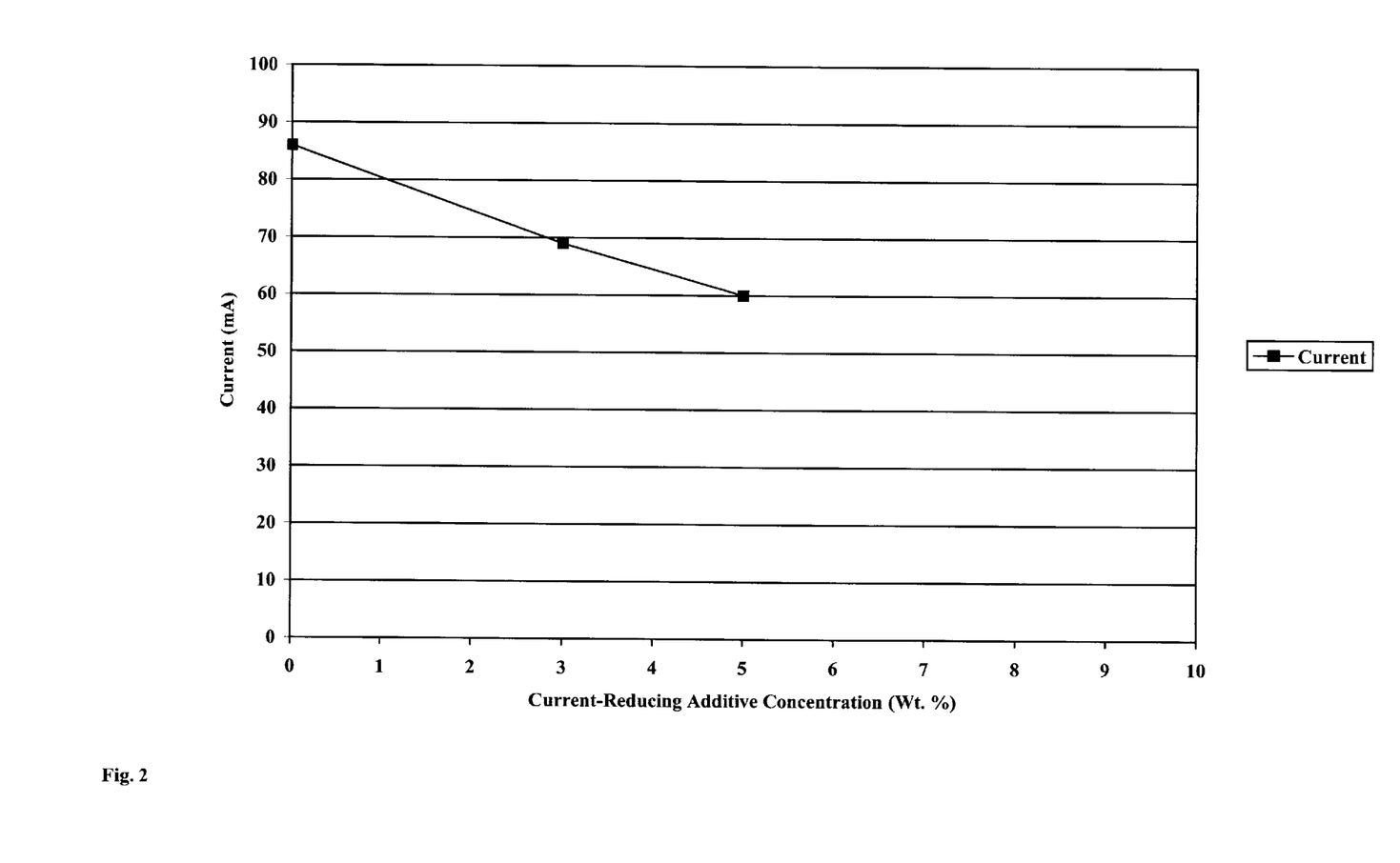
FIG. 2 of the drawings is a plot showing change in current as a function of current-reducing additive concentration for Experiment No. 1.

Current for each one of the mirrors containing media from experiment No. 1 was measured at an electrical potential of 1.2 volts at a steady state condition using conventional techniques, the results of which are provided in FIG. 2. As is shown in FIG. 2, increasing the concentration of the PMMA additive, having an average molecular weight of approximately 350,000 Daltons, from 0 to 5% by weight, modestly reduced the current without adversely affecting the reflective properties of the electrochromic medium.

However, because the viscosity of media containing the high molecular weight PMMA additive was so great, vacuum backfilling the electrochromic device with a medium having a greater additive concentration was not possible using conventional device components. As such, larger reductions in current were not obtainable. It was also noted that dependence of the mirror reflectance on applied voltage was identical for each polymer loading concentration.

Experiment No. 2

In experiment No. 2, the electrochromic medium was prepared by mixing the following materials together in the concentrations provided below:

| Component | Material | Concentration |
|---|---|---|
| Cathodic | Octylviologen [$BF_4$]$_2$ | 38.0 mM |
| Anodic | 5,10-Dimethyl-5,10-dihydrophenazine | 27.0 mM |
| Current-Reducing Additive | PMMA (12,000 Daltons) | 0, 3, 10, and 15% by wt. |
| Solvent | Propylene carbonate | — |

Figure 3:
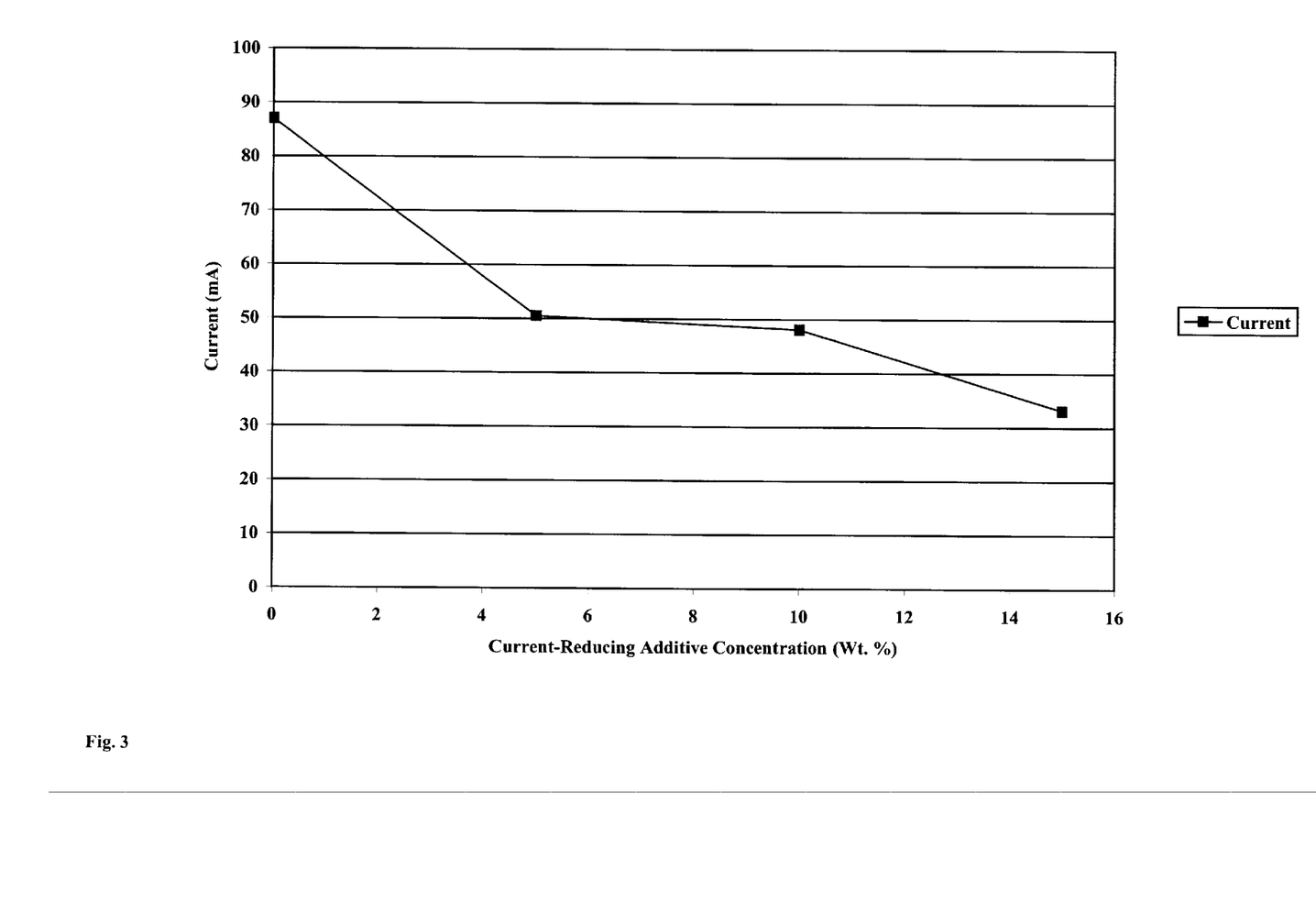
FIG. 3 of the drawings is a plot showing change in current as a function of current-reducing additive concentration for Experiment No. 2.

Current for each one of the mirrors containing media from experiment No. 2 was measured at an electrical potential of 1.2 volts at a steady state condition using conventional techniques, the results of which are provided in FIG. 3. As is shown in FIG. 3, increasing the concentration of the PMMA additive, having an average molecular weight of approximately 12,000 Daltons, from 0 to 15% by weight, materially reduced the current approximately 65% without adversely affecting the reflective properties of the electrochromic medium. It was also noted that dependence of the mirror reflectance on applied voltage was identical for each polymer loading concentration.

Experiment No. 3

In experiment No. 3, the electrochromic medium was prepared by mixing the following materials together in the concentrations provided below:

| Component | Material | Concentration |
|---|---|---|
| Cathodic | Octylviologen [$BF_4$]$_2$ | 38.0 mM |
| Anodic | 5,10-Dimethyl-5,10-dihydrophenazine | 27.0 mM |
| Current-Reducing Additive | PVA (12,800 Daltons) | 0, 3, 5, 10, 15, and 25% by wt. |
| Solvent | Propylene carbonate | — |

Figure 4:
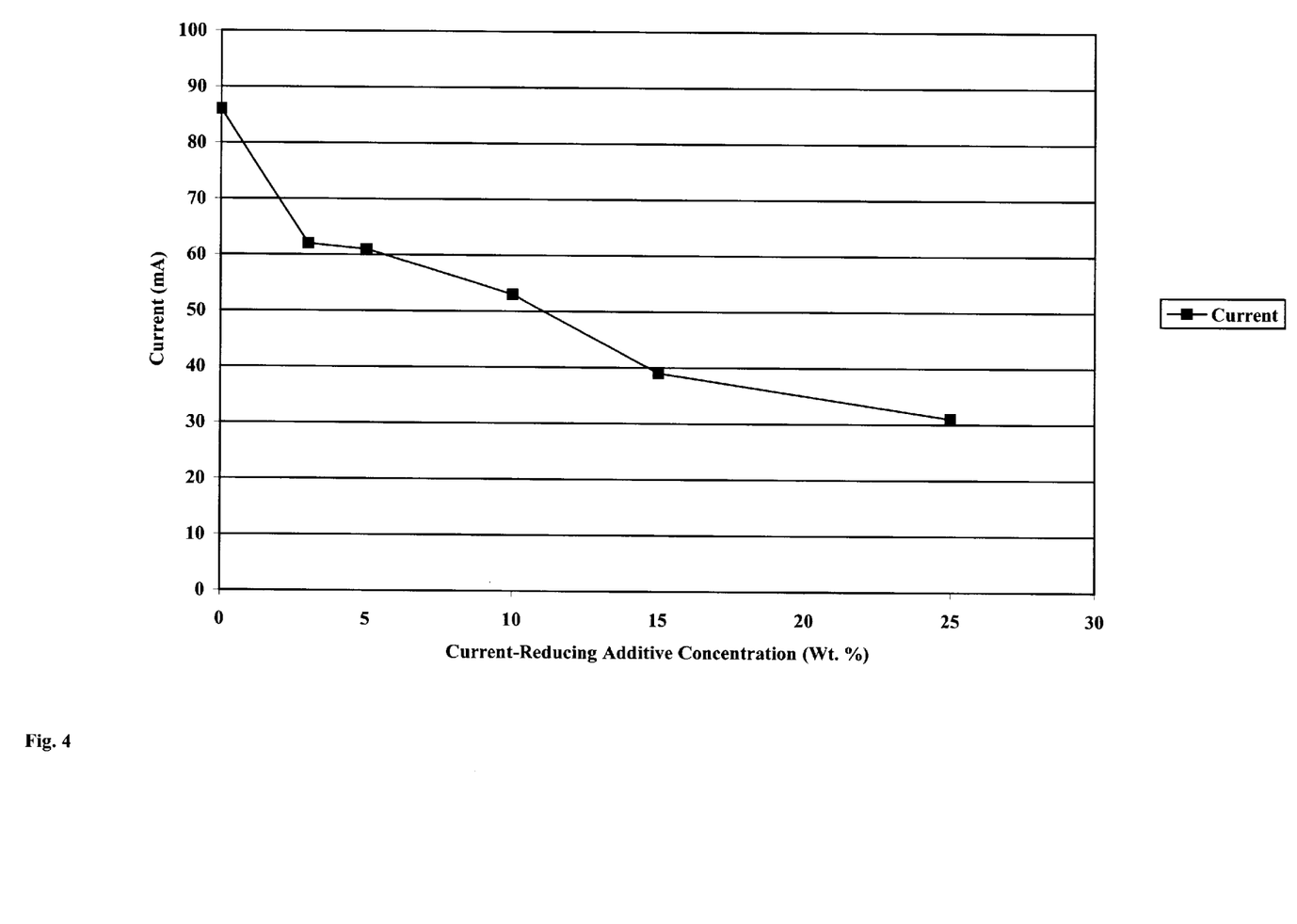
FIG. 4 of the drawings is a plot showing change in current as a function of current-reducing additive concentration for Experiment No. 3.

Current for each one of the mirrors containing media from experiment No. 3 was measured at an electrical potential of 1.2 volts at a steady state condition using conventional techniques, the results of which are provided in FIG. 4. As is shown in FIG. 4, increasing the concentration of the PVA additive, having an average molecular weight of approximately 12,800 Daltons, from 0 to 25% by weight, materially reduced the current approximately 65% without adversely affecting the reflective properties of the electrochromic medium. It was also noted that dependence of the mirror reflectance on applied voltage was identical for each polymer loading concentration.

Experiment No. 4

In experiment No. 4, the electrochromic medium was prepared by mixing the following materials together in the concentrations provided below:

| Component | Material | Concentration |
|---|---|---|
| Cathodic | Octylviologen [$BF_4$]$_2$ | 38.0 mM |
| Anodic | 5,10-Dimethyl-5,10-dihydrophenazine | 27.0 mM |
| Current-Reducing Additive | Lexorez 1931-50* (2,000 Daltons) | 0, 3, 5, 10, 15, 25, and 50% by wt. |
| Solvent | Propylene carbonate | — |

*Lexorez 1931-50 is commercially available from Inolex Chemical Co.

Figure 5:
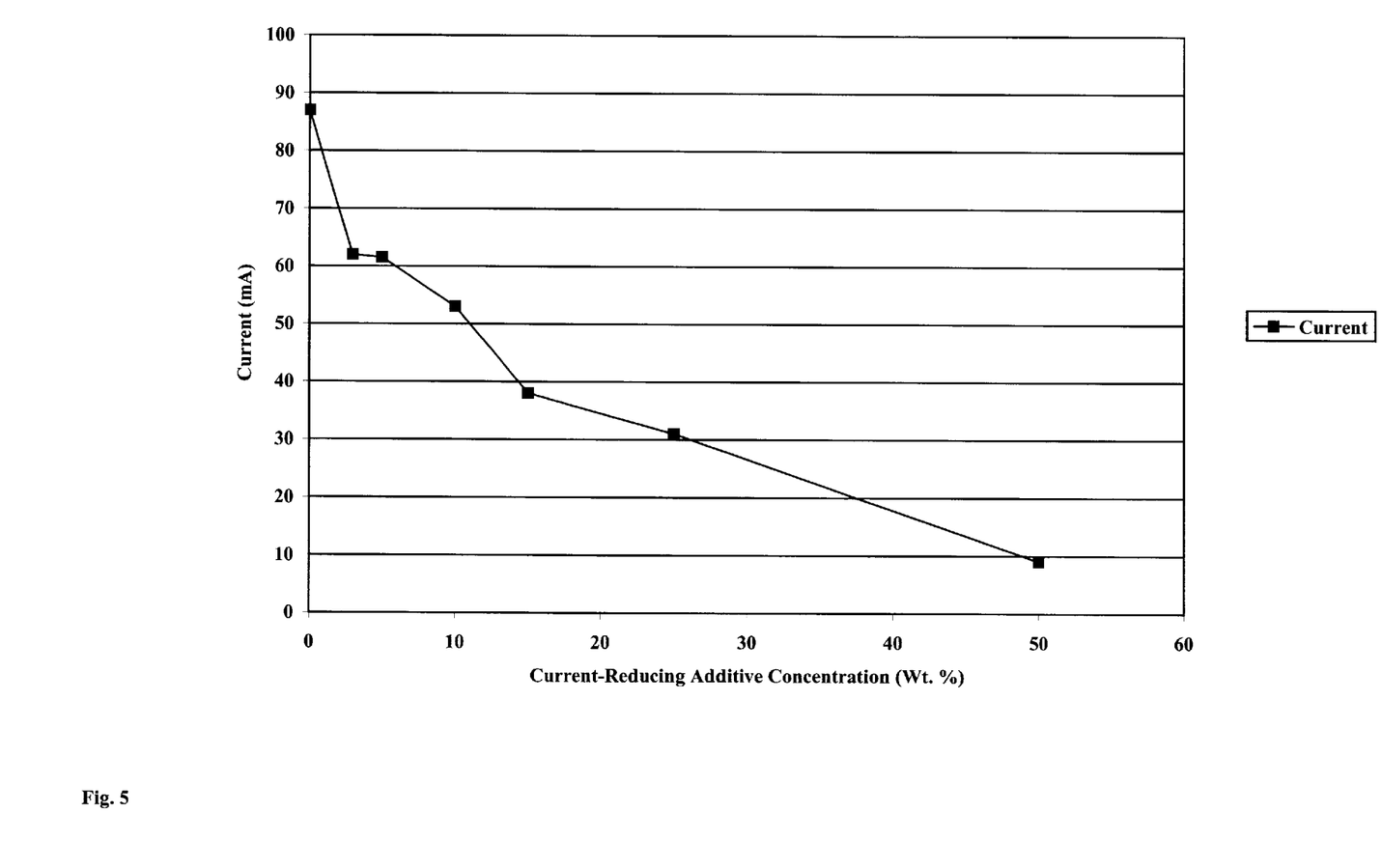
FIG. 5 of the drawings is a plot showing change in current as a function of current-reducing additive concentration for Experiment No. 4.

Current for each one of the mirrors containing media from experiment No. 5 was measured at an electrical potential of 1.2 volts at a steady state condition using conventional techniques, the results of which are provided in FIG. 5. As is shown in FIG. 5, increasing the concentration of the Lexorez additive, having an average molecular weight of approximately 2,000 Daltons, from 0 to 50% by weight, materially reduced the current approximately 90% without adversely affecting the reflective properties of the electrochromic medium. It was also noted that dependence of the mirror reflectance on applied voltage was identical for each polymer loading concentration.

As can be seen from many of the above-provided experiments, the incorporation of one or more of the disclosed current-reducing additives into an electrochromic medium materially reduces the operating current of an associated electrochromic device, and as will be explained below, the relatively low viscosity of the electrochromic medium facilitates acceptable production rates without a problematic degree of seal or other device component failure.

In further support of the present invention, the viscosity of several of the above-identified current-reducing additives was measured using a conventional Brookfield DV II viscometer. The results are provided in Table I.

TABLE I

| Current-Reducing Additive | % Wt/Wt | MW (Daltons) | Temperature (C.) | Centipoise (cP) | Centistokes (cS) |
|---|---|---|---|---|---|
| PMMA | 3 | 350,000 | 21 | 31 | 26.1 |
| PMMA | 5 | 350,000 | 20.4 | 428 | 359.7 |
| PMMA | 11.2 | 120,000 | 19.6 | 297 | 249.6 |
| PMMA/PEA | 11.2 | 101,000 | 20.4 | 204 | 171.4 |
| PVA | 10 | 100,000 | 19.6 | 80 | 67.2 |
| PVA | 10 | 12,800 | 20.4 | 9 | 7.6 |
| PVA | 15 | 12,800 | 20.4 | 34 | 28.6 |

Figure 6:
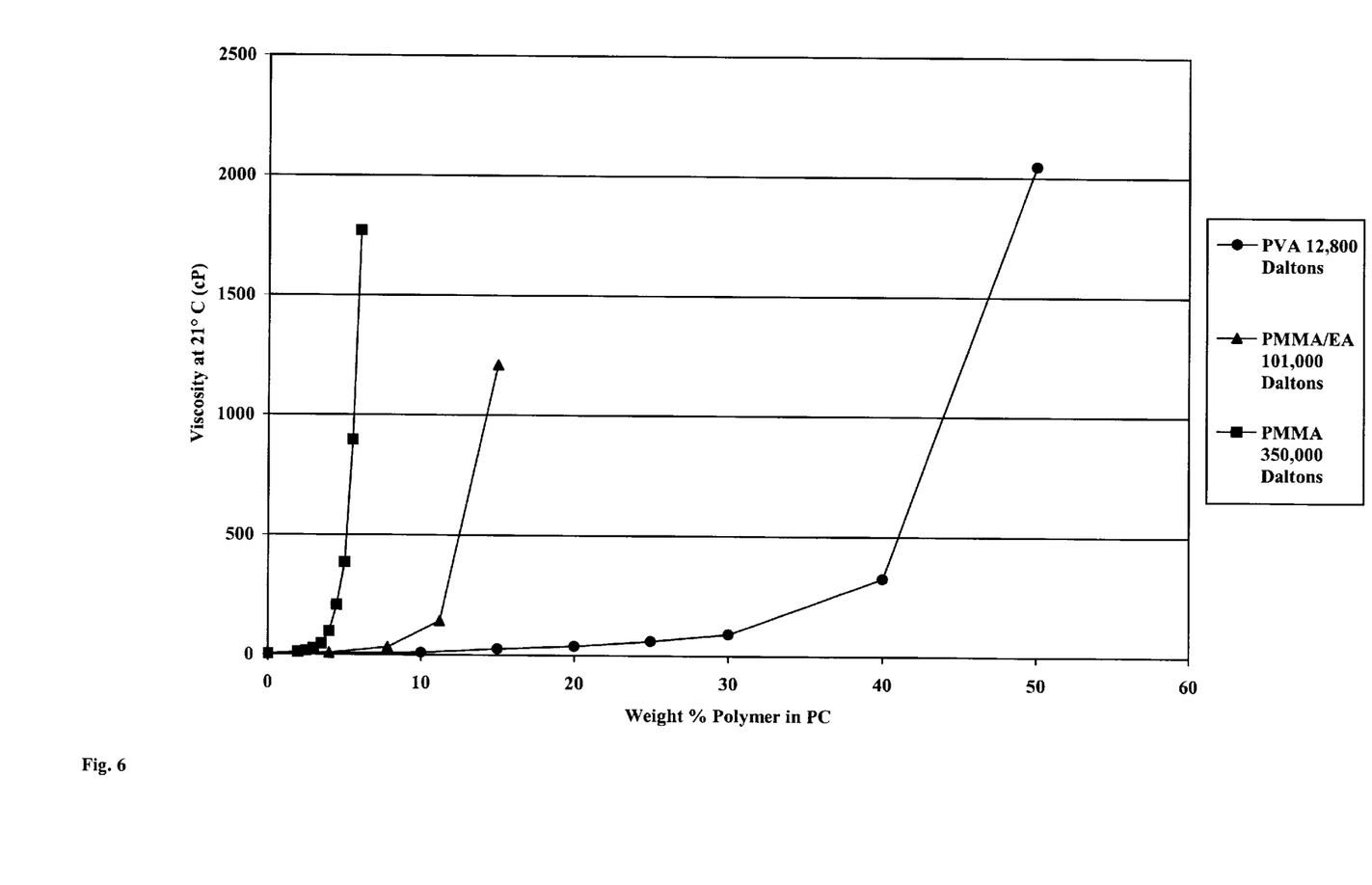
FIG. 6 of the drawings is a plot showing change in viscosity as a function of current-reducing additive concentration for a plurality of current-reducing additives provided herein.

As can be seen from Table I, among other things, the 350,000 Dalton PMMA loaded to a concentration of only 5% is commercially undesirable because of its enormous viscosity. However, the 101,000 Dalton PMMA/PEA co-polymer loaded to a concentration of 11.2%, the 100,000 Dalton PVA loaded to a concentration of 10%, and the 12,800 Dalton PVA loaded to a concentration of 15% exhibit desirable viscosities which will facilitate acceptable production rates without a problematic degree of seal or other device component failure, and, as was shown in experiments 1–4, such large loading concentrations of the current-reducing additive will materially reduce current of an associated device, and/or allow for reduced cell spacing while maintaining a substantially unchanged current. Moreover, FIG. 6 of the present invention clearly shows, among other things, that the 350,000 Dalton PMMA exhibits a viscosity of over 1,500 cP at a loading of less than 10% by weight; by comparison the 12,800 Dalton PVA exhibits a viscosity of only 91 cP at a loading of 30% by weight.

While the invention has been described in detail herein in accordance with certain preferred embodiments thereof, many modifications and changes therein may be effected by those skilled in the art. Accordingly, it is our intent to be limited only by the scope of the appending claims and not by way of details and instrumentalities describing the embodiments shown herein.

What is claimed is:

1. An electrochromic medium for use in an electrochromic device, comprising:
   at least one solvent;
   an anodic electroactive material;
   a cathodic electroactive material, wherein at least one of the anodic and cathodic electroactive materials is electrochromic;
   a current-reducing additive, wherein the current-reducing additive comprises a polymer present in an effective concentration to reduce the current of the electrochromic medium upon application of an electrical potential relative to an electrochromic medium without the current-reducing additive by at least approximately 20%; and
   wherein the electrochromic medium comprises a viscosity of less than approximately 150 cP at 20° C.

2. The electrochromic medium according to claim 1, wherein the average molecular weight of the current-reducing additive is greater than approximately 1,000 Daltons.

3. The electrochromic medium according to claim 1, wherein the average molecular weight of the current-reducing additive ranges from approximately 1,500 Daltons to approximately 125,000 Daltons.

4. The electrochromic medium according to claim 1, wherein the average molecular weight of the current-reducing additive ranges from approximately 1,500 Daltons to approximately 50,000 Daltons.

5. The electrochromic medium according to claim 1, wherein the current-reducing additive is present in a concentration ranging from approximately 5% by weight to approximately 75% by weight.

6. The electrochromic medium according to claim 1, wherein the current-reducing additive is present in a concentration ranging from approximately 8% by weight to approximately 30% by weight.

7. The electrochromic medium according to claim 1, wherein the current-reducing additive is selected from the group comprising polyamides, polyimides, polycarbonates, polyesters, polyethers, polymethacrylates, polyacrylates, polysilanes, polysiloxanes, polyvinylacetates, polyacrylonitriles, polyvinylalcohols, and combinations thereof.

8. The electrochromic medium according to claim 1, wherein the current-reducing additive is present in an effective concentration to reduce the current of the electrochromic medium upon application of an electrical potential relative to an electrochromic medium without the current-reducing additive by at least approximately 40%.

9. The electrochromic medium according to claim 1, wherein the viscosity of the electrochromic medium is less than approximately 100 cP.

10. The electrochromic medium according to claim 9, wherein the average molecular weight of the current-reducing additive is greater than approximately 1,000 Daltons.

11. The electrochromic medium according to claim 9, wherein the average molecular weight of the current-reducing additive ranges from approximately 1,500 Daltons to approximately 125,000 Daltons.

12. The electrochromic medium according to claim 9, wherein the average molecular weight of the current-reducing additive ranges from approximately 1,500 Daltons to approximately 50,000 Daltons.

13. The electrochromic medium according to claim 9, wherein the current-reducing additive is present in a concentration ranging from approximately 5% by weight to approximately 75% by weight.

14. The electrochromic medium according to claim 9, wherein the current-reducing additive is present in a concentration ranging from approximately 8% by weight to approximately 30% by weight.

15. The electrochromic medium according to claim 9, wherein the current-reducing additive is selected from the group comprising polyamides, polyimides, polycarbonates, polyesters, polyethers, polymethacrylates, polyacrylates, polysilanes, polysiloxanes, polyvinylacetates, polyacrylonitriles, polyvinylalcohols, and combinations thereof.

16. The electrochromic medium according to claim 9, wherein the current-reducing additive is present in an effective concentration to reduce the current of the electrochromic medium upon application of an electrical potential relative to an electrochromic medium without the current-reducing additive by at least approximately 40%.

17. The electrochromic medium according to claim 1, wherein the viscosity of the electrochromic medium is less than approximately 50 cP.

18. The electrochromic medium according to claim 17, wherein the average molecular weight of the current-reducing additive is greater than approximately 1,000 Daltons.

19. The electrochromic medium according to claim 17, wherein the average molecular weight of the current-reducing additive ranges from approximately 1,500 Daltons to approximately 125,000 Daltons.

20. The electrochromic medium according to claim 17, wherein the average molecular weight of the current-reducing additive ranges from approximately 1,500 Daltons to approximately 50,000 Daltons.

21. The electrochromic medium according to claim 17, wherein the current-reducing additive is present in a concentration ranging from approximately 5% by weight to approximately 75% by weight.

22. The electrochromic medium according to claim 17, wherein the current-reducing additive is present in a concentration ranging from approximately 8% by weight to approximately 30% by weight.

23. The electrochromic medium according to claim 17, wherein the current-reducing additive is selected from the group comprising polyamides, polyimides, polycarbonates, polyesters, polyethers, polymethacrylates, polyacrylates, polysilanes, polysiloxanes, polyvinylacetates, polyacrylonitriles, polyvinylalcohols, and combinations thereof.

24. The electrochromic medium according to claim 17, wherein the current-reducing additive is present in an effective concentration to reduce the current of the, electrochromic medium upon application of an electrical potential relative to an electrochromic medium without the current-reducing additive by at least approximately 40%.

25. An electrochromic device, comprising:
   a first substantially transparent substrate having an electrically conductive material associated therewith;
   a second substrate having an electrically conductive material associated therewith; and
   an electrochromic medium contained within a chamber positioned between the first and second substrates which comprises:
      at least one solvent;
      an anodic electroactive material;
      a cathodic electroactive material, wherein at least one of the anodic and cathodic electroactive materials is electrochromic;
      a current-reducing additive, wherein the current-reducing additive comprises a polymer present in an effective concentration to reduce the current of the electrochromic medium upon application of an electrical potential relative to an electrochromic medium without the current-reducing additive by at least approximately 20%; and
      wherein the electrochromic medium comprises a viscosity of less than approximately 150 cP at 20° C.

26. The electrochromic device according to claim 25, wherein the average molecular weight of the current-reducing additive is greater than approximately 1,000 Daltons.

27. The electrochromic device according to claim 25, wherein the average molecular weight of the current-reducing additive ranges from approximately 1,500 Daltons to approximately 125,000 Daltons.

28. The electrochromic device according to claim 25, wherein the average molecular weight of the current-reducing additive ranges from approximately 1,500 Daltons to approximately 50,000 Daltons.

29. The electrochromic device according to claim 25, wherein the current-reducing additive is present in a concentration ranging from approximately 5% by weight to approximately 75% by weight.

30. The electrochromic device according to claim 25, wherein the current-reducing additive is present in a concentration ranging from approximately 8% by weight to approximately 30% by weight.

31. The electrochromic device according to claim 25, wherein the current-reducing additive is selected from the group comprising polyamides, polyimides, polycarbonates, polyesters, polyethers, polymethacrylates, polyacrylates, polysilanes, polysiloxanes, polyvinylacetates, polyacrylonitriles, polyvinylalcohols, and combinations thereof.

32. The electrochromic device according to claim 25, wherein the current-reducing additive is present in an effective concentration to reduce the current of the electrochromic medium upon application of an electrical potential relative to an electrochromic medium without the current-reducing additive by at least approximately 40%.

33. The electrochromic device according to claim 25, wherein the viscosity of the electrochromic medium is less than approximately 100 cP.

34. The electrochromic device according to claim 33, wherein the average molecular weight of the current-reducing additive is greater than approximately 1,000 Daltons.

35. The electrochromic device according to claim 33, wherein the average molecular weight of the current-reducing additive ranges from approximately 1,500 Daltons to approximately 125,000 Daltons.

36. The electrochromic device according to claim 33, wherein the average molecular weight of the current-reducing additive ranges from approximately 1,500 Daltons to approximately 50,000 Daltons.

37. The electrochromic device according to claim 33, wherein the current-reducing additive is present in a concentration ranging from approximately 5% by weight to approximately 75% by weight.

38. The electrochromic device according to claim 33, wherein the current-reducing additive is present in a concentration ranging from approximately 8% by weight to approximately 30% by weight.

39. The electrochromic device according to claim 33, wherein the current-reducing additive is selected from the group comprising polyamides, polyimides, polycarbonates, polyesters, polyethers, polymethacrylates, polyacrylates, polysilanes, polysiloxanes, polyvinylacetates, polyacrylonitriles, polyvinylalcohols, and combinations thereof.

40. The electrochromic device according to claim 33, wherein the current-reducing additive is present in an effective concentration to reduce the current of the electrochromic medium upon application of an electrical potential relative to an electrochromic medium without the current-reducing additive by at least approximately 40%.

41. The electrochromic device according to claim 25, wherein the viscosity of the electrochromic medium is less than approximately 50 cP.

42. The electrochromic device according to claim 41, wherein the average molecular weight of the current-reducing additive is greater than approximately 1,000 Daltons.

43. The electrochromic device according to claim 41, wherein the average molecular weight of the current-reducing additive ranges from approximately 1,500 Daltons to approximately 125,000 Daltons.

44. The electrochromic device according to claim 41, wherein the average molecular weight of the current-reducing additive ranges from approximately 1,500 Daltons to approximately 50,000 Daltons.

45. The electrochromic device according to claim 41, wherein the current-reducing additive is present in a concentration ranging from approximately 5% by weight to approximately 75% by weight.

46. The electrochromic device according to claim 41, wherein the current-reducing additive is present in a concentration ranging from approximately 8% by weight to approximately 30% by weight.

47. The electrochromic device according to claim 41, wherein the current-reducing additive is selected from the group comprising polyamides, polyimides, polycarbonates, polyesters, polyethers, polymethacrylates, polyacrylates, polysilanes, polysiloxanes, polyvinylacetates, polyacrylonitriles, polyvinylalcohols, and combinations thereof.

48. The electrochromic device according to claim 41, wherein the current-reducing additive is present in an effective concentration to reduce the current of the electrochromic medium upon application of an electrical potential relative to an electrochromic medium without the current-reducing additive by at least approximately 40%.

49. The electrochromic device according to claim 25, wherein the cathodic material comprises a viologen.

50. The electrochromic device according to claim 25, wherein the cathodic material comprises tungsten oxide.

51. The electrochromic device according to claim 25, wherein the anodic material is selected from the group comprising ferrocene, substituted ferrocenes, substituted ferrocenyl salts, substituted phenazines, phenothiazine, substituted phenothiazines, thianthrene, substituted thianthrenes, and combinations thereof.

52. The electrochromic device according to claim 25, wherein the device is an electrochromic window.

53. The electrochromic device according to claim 25, wherein the second substrate is plated with a reflective material.

54. The electrochromic device according to claim 53, wherein the reflective material is selected from the group comprising chromium, rhodium, ruthenium, gold, silver, alloys containing the same, and combinations thereof.

55. The electrochromic device according to claim 54, wherein the device is an electrochromic mirror.

56. An electrochromic device, comprising:
at least one substantially transparent substrate having an electrically conductive material associated therewith; and
an electrochromic medium comprising:
at least one solvent;
an anodic electroactive material;
a cathodic electroactive material, wherein at least one of the anodic and cathodic electroactive materials is electrochromic;
a current-reducing additive, wherein the current-reducing additive comprises a polymer present in an effective concentration to reduce the current of the electrochromic medium upon application of an electrical potential relative to an electrochromic medium without the current-reducing additive by at least approximately 20%; and
wherein the electrochromic medium comprises a viscosity of less than approximately 150 cP at 20° C.

57. An electrochromic medium for use in an electrochromic device, comprising:
at least one solvent;
an anodic electroactive material;
a cathodic electroactive material, wherein at least one of the anodic and cathodic electroactive materials is electrochromic;
a current-reducing additive, wherein the current-reducing additive comprises a polymer present in an effective concentration to reduce the current of the electrochromic medium upon application of an electrical potential relative to an electrochromic medium without the current-reducing additive by at least approximately 20%; and
wherein the average molecular weight of the current-reducing additive ranges from approximately 1,000 Daltons to approximately 85,000 Daltons.

58. The electrochromic medium according to claim 57, wherein the average molecular weight of the current-reducing additive ranges from approximately 1,500 Daltons to approximately 50,000 Daltons.

59. An electrochromic medium for use in an electrochromic device, comprising:
at least one solvent;
an anodic electroactive material;
a cathodic electroactive material, wherein at least one of the anodic and cathodic electroactive materials is electrochromic;
a current-reducing additive, wherein the current-reducing additive is present in a concentration greater than 12% by weight; and
wherein the electrochromic medium comprises a viscosity of less than approximately 150 cP at 20° C.

60. The electrochromic medium according to claim 59, wherein the current-reducing additive is present in a concentration greater than 15% by weight.

\* \* \* \* \*